EXPANSION JOINTS FOR METAL PANELS

Original Filed Nov. 28, 1960 3 Sheets-Sheet 1

INVENTORS
Harvey L. Patry
Francis J. Patry
Ernest Patry
H. Blair Lamont

BY Moore & Hall
ATTORNEYS

EXPANSION JOINTS FOR METAL PANELS

Original Filed Nov. 28, 1960 3 Sheets-Sheet 2

INVENTORS
Harvey L. Patry
Francis J. Patry
Ernest Patry
H. Blair Lamont
BY
Moore & Hall
ATTORNEYS

EXPANSION JOINTS FOR METAL PANELS

Original Filed Nov. 28, 1960 3 Sheets-Sheet 3

INVENTORS
Harvey L. Patry
Francis J. Patry
Ernest Patry
H. Blair Lamont

BY Moore & Hall
ATTORNEYS

United States Patent Office

Re. 25,733
Reissued Feb. 23, 1965

25,733

EXPANSION JOINTS FOR METAL PANELS

Harvey L. Patry, Ernest Patry, and Francis J. Patry, Lewiston, and H. Blair Lamont, Lincolnville, Maine, assignors, by mesne assignments, to Lamont & Riley, Inc., Worcester, Mass., a corporation of Massachusetts Original No. 3,123,188, dated Mar. 3, 1964, Ser. No. 72,179, Nov. 28, 1960. Application for reissue June 30, 1964, Ser. No. 391,352
11 Claims. (Cl. 189—36)

Matter enclosed in heavy brackets [ ] appears in the original patent but forms no part of this reissue specification; matter printed in italics indicates the additions made by reissue.

This application is a continuation-in-part of co-pending application Serial No. 528,443, filed August 15, 1955, now abandoned, for "Expansion Joint for Metal Panels."

The present invention concerns improvements in the techniques and means for joining metal panels in roof structures, flashings, waterstops, expansion joints, deck joints, splices, and the like. In this respect, the present invention is particularly concerned with a structural unit which may be used in the aforementioned arrangements or which may be employed in conjunction with similar such units, through appropriate splicing techniques, to be described, in the fabrication of relatively large structural expanses capable of use in roofs, walls, or other constructions; and adapted in such arrangements to assume various shapes and surface contours not readily possible with other building materials conventionally employed.

The basic unit, as will be described, which provides for all of these arrangements, constitutes a pair of elongated flexible metal panels spaced from one another along their elongated edges, and joined to one another in a unique manner by a further elongated panel of flexible material such as neoprene. The structural building element thus provided is of elongated strip form; and such a building unit may be employed per se in various arrangements to be described; or in the alternative, a plurality of such building elements may be joined to one another to provide relatively large structural expanses.

It is an object of the invention to provide an improved type of expansion joint used in connecting two similar metals or dissimilar metals to form an elastic and waterproof expansion joint for metal flashings, concrete, and steel structures.

A further object of the present invention resides in the provision of an improved structural building unit capable of employment per se, or with similar such units, in the provision of a waterproof barrier capable of assuming any of many different surface contours and structural configurations.

A still further object of the present invention resides in the provision of a unique form of metal-neoprene structural unit of elongated strip configuration; and, more particularly, in the provision of such a unit wherein both the metal and neoprene (or other flexible material) portions thereof may be caused to exhibit any of many different surface contours without affecting the waterproof nature or structural strength of the unit.

It is another object of the invention to provide an expansion joint wherein dissimilar types of metal panels may be joined into a single panel capable of expanding and contracting with temperature changes.

It is a further object of the invention to provide a flexible joint structure wherein panels of copper, aluminum, steel, stainless steel, galvanized iron, tin plate, or the like, are joined by neoprene, or other flexible material of like characteristics to form continuous panels having watertight seal and expansion joints.

It is a still further object of the invention to fabricate construction materials in continuous lengths for fast, economical installation in the field where standard lengths may be quickly joined to prefabricated corners or crossovers, or to form uninterrupted spans of one or more hundreds of feet long.

It is a further object of the invention to provide novel wall-to-floor joints, through wall joints, roof expansion joints, roof joints at a parapet, deck joints, and long-life splices.

Still another object of the present invention resides in the provision of a joint comprising resilient neoprene rubber strip capable of an elongation of at least one hundred percent and having a tensile strength greater than one thousand pounds per square inch joined to metal edging with a combination mechanical-adhesive bond, giving elasticity combined with the lifelong qualities of weather-resistant metals. In this latter respect, it should be noted that neoprene is a synthetic rubber having the characteristic qualities of natural rubber such as resilience, abrasion resistance, low compression set plus flame retardance, and low permeability, retaining these properties in high degree under prolonged exposure to sunlight, weather, ozone, oxygen, oils, greases, heat and chemicals. The mechanical-adhesive bond mentioned, utilizes adhesive to produce the highest strength bond between the cured neoprene and the metal edging. The adhesives preferably comprise a neoprene-based system comprising a primer and vulcanizing cement, yielding a peel-pull value in excess of 35 pounds per inch per minute at right angles. Metal edging in leaded copper, copper or aluminum utilizes the tube-in-sheet principle, assuring highest physical properties of cold-rolled sheet metal together with maximum bonded strength. Stainless steel or galvanized iron edging may be fabricated by folding to shape.

Reference is made to the Encyclopaedia Britannica, vol. 19, pp. 606–608, published 1958, on synthetic rubbers which comprise copolymers of butadiene and styrene, neoprene, butyl, copolymers of butadiene and acrylonitrile, plasticized polyvinyl esters such as "Koroseal," "Vinylite" and "Geon," silicone and silastic rubbers, acrylates, together with other materials there listed under the heading Synthetic Rubber. Reference is also made to Elastomers and Plastomers, Their Chemistry, Physics and Technology, 3 vol., R. Houwink, editor, published by Houston and London 1948; Synthetic Rubber, G. S. Whitby, editor, New York 1954. Synthetic rubber and elastomers are equivalent generic terms of art which have gained wide acceptance for materials having high extensibility, the latter term including the former.

It should be noted that although the extensibility of synthetic rubber is one reason it is in the joint structure, the application of a stretching load to the joint applies force to the bond between the panels and the synthetic rubber. If the lateral edge of the synthetic rubber within the bifurcation is permitted to yield, it tends to stretch and to apply highly localized load to the bond between the rubber strip and the relatively inextensible material of the panel causing bond failure at the outer edge where extension is greatest. Initial failure here transfers the localized load farther in the bifurcation and progressive, incremental, step-by-step failure of the bond takes place. This is avoided or minimized by providing firm bonding fit to the edge of the synthetic rubber material between the opposed surfaces of the bifurcation and substantially filling this space so that the bonded faces lie in close bonding contact over their opposed areas. The rubber material need not go to the bottom of the bifurcation, but should be in firm contact with the opposed faces of the bifurcation and filling the space therebetween.

It is an object of the invention to provide a joint structure which is flexible, the neoprene section eliminating metal fatigue prevalent in prior art all-metal joints; and continuous length rolls of such a joint structure, having a length of 25 feet to 100 or more feet, may be provided in accordance with the present invention, to eliminate soldered or caulked joints and to assure water-tightness. The joint structure, or structural building unit comprises, as will be described, a pair of metallic elements having a neoprene insert therebetween. The neoprene insert permits installation of the unit without initial installation tension or pre-stressing inherent in molded or extruded joints, and has a tensile strength of 1500 pounds per square inch minimum with permissible elongation in excess of 250%. Temperature resistance permits a wide range of ambient temperature ranging from −30° F. to +220° F. Simplicity of construction reduces cost and supplies versatility by permitting, inter alia, wide dimensional variation, opening the possibility of such diverse applications as flexible roofing, vibration isolators, membranes, gutters, and the like.

The basic unit of the present invention comprises, as will appear hereinafter, a waterproof structural element flexible in nature and adapted to be supplied in roll form for use alone, or with similar such structural elements. Each such roll comprises a pair of elongated metal strips spaced from one another along their elongated edges, with the facing spaced edges of said metal strips or panels being provided with joints, preferably bifurcated in nature, and receiving therebetween a further elongated strip of flexible waterprof material such as neoprene. The neoprene strip is, by its nature, capable of free movement in three dimensions whereby it serves to eliminate metal fatigue prevalent in conventional all-metal joints; and the metal components of the structural unit are moreover preferably fabricated sufficiently light gauge metal to permit these metal portions to be bent in various manners, preferably in their elongated directions, whereby the structural unit, and both the metal and neoprene portions thereof, may assume a wide variety of shapes and surface configurations, such as may be desired by particular building applications. The structural unit is thus capable of wide dimensional variation and of many surface configurations, dictated only by the particular installation in which the unit is to be employed; and the unit is in fact such, as will appear hereinafter, that a plurality of such units may be readily joined or spliced to one another to form uninterrupted spans of the metal-neoprene materials.

The basic structural unit, and some typical uses to which it may be put, will now be described in conjunction with the several figures.

Figure 1:
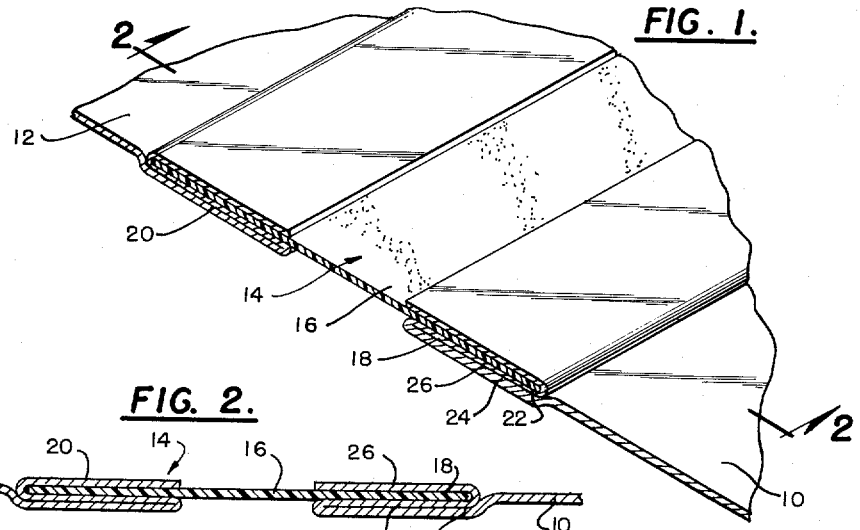
FIGURE 1 is a fragmentary perspective view of one form of structural unit constructed in accordance with the invention.
Figure 2:
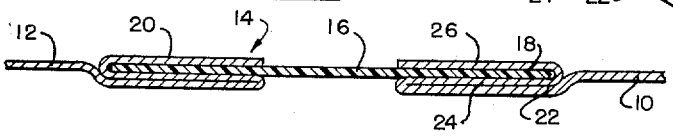
FIGURE 2 is a section taken along line 2—2 of FIGURE 1.

In FIGURES 1 and 2, metal panels 10 and 12 are formed into a waterproof extensible resilient joint 14 by means of synthetic rubber strip 16, e.g. neoprene, which is held by bifurcations integral with the panels 10 and 12. The bifurcations are formed by an offset section 22, a section 24 turned back upon and flattened against section 22 and a section 26 spaced from section 24 a sufficient distance to receive marginal edge 18 of strip 16 in cemented bonded relation. The opposite marginal edge 20 of strip 16 is bonded in the same way to panel 12.

Figure 3:
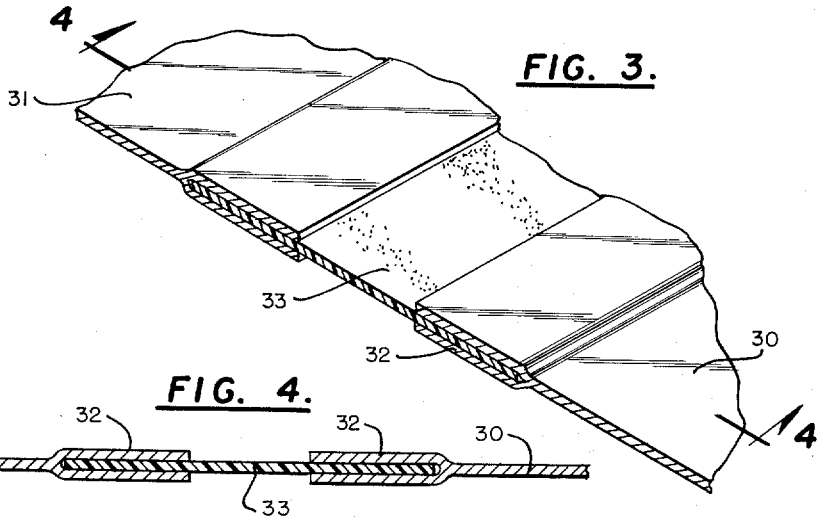
FIGURE 3 is a fragmentary perspective view of a preferred form of joint according to the invention.
Figure 4:
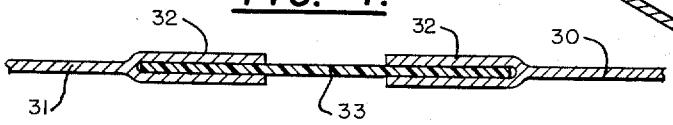
FIGURE 4 is a section along line 4—4 of FIGURE 3.
Figure 4A:
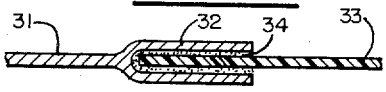
FIGURE 4A is a fragmentary section of an enlarged detail of FIGURE 4.
Figure 4B:
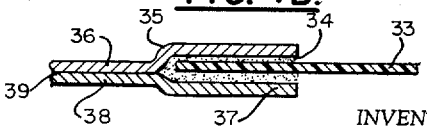
FIGURE 4B is a modification of FIGURE 4A.

FIGURES 3, 4, and 4A show a preferred form of joint, between the metal and neoprene sections of the unit, in which the bifurcations are formed, at the opposed ends of metal panels 30 and 31, as integral U-shaped edge portions 32 adapted respectively to receive the elongated marginal edges 34 of neoprene strip 33 in bonded relation therebetween. The marginal edges 34 are, as particularly illustrated in FIGURE 4A, held in place by the mechanical clamping strength of the bifurcations comprising edge portions 32, as well as by contact cement. This same general arrangement is shown in FIGURE 4B; but in the alternative arrangement of this latter figure, the metal panels (corresponding to 30 and 31) are each formed by a pair of superposed panels 36 and 38, joined to one another at 39. In this latter arrangement, the marginal edges of panels 36 and 38 are each offset, as at 35 and 37, to provide the desired U-shaped edge portion for reception of the edge 34 of neoprene section 33.

Figure 5:
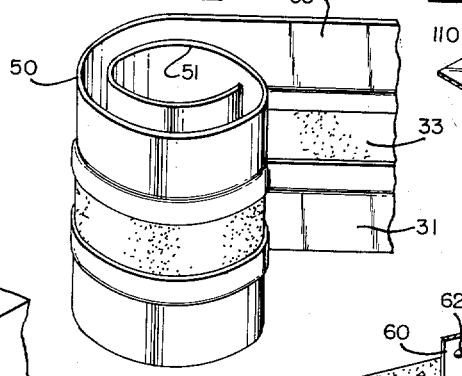
FIGURE 5 is a fragmentary view of a rolled continuous length of jointed material, comprising the improved structural unit of the present invention.

FIGURE 5 shows a 25-foot length of joint material constructed in the manner described above; and, as illustrated by this figure, lengths of the unit may readily be coiled or rolled, as at 50, for easy handling and installation. For shipping, the coil convolutions 51 would be wrapped more tightly than shown, and are usually wrapped tightly in contact. A standard roll of the structural or joint material, such as is shown in FIGURE 5, may also be provided at one of its ends with a double tab of neoprene (e.g. similar to that to be described hereinafter in reference to FIGURE 14); and a plurality of lengths of the structural material, comprising for example a plurality of rolls similar to that shown in FIGURE 5 may be spliced to one another by techniques such as will also be described, to provide any desired length of material.

Figure 6:
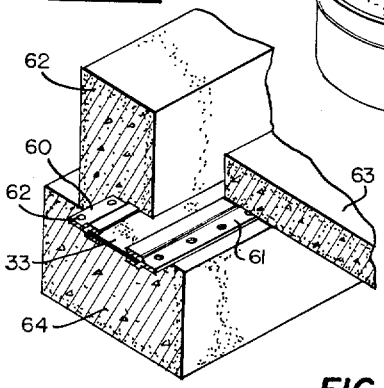
FIGURE 6 is a perspective view of a wall-to-floor joint according to the invention.

In FIGURE 6 the metal panels 60 and 61 are provided with perforations 62 to improve their bond with mortar. FIGURE 6 illustrates such a perforated unit installed horizontally to provide a continuous flexible seal 33 between a vertical wall or column 62 and a floor section 63, both supported by a beam 64.

Figure 7:
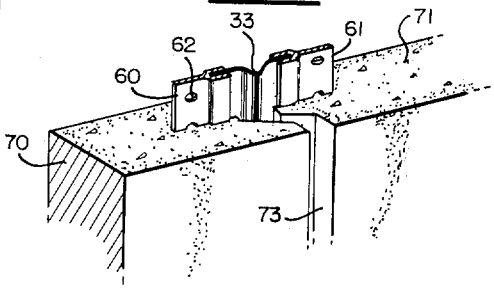
FIGURE 7 is a perspective view of a through wall joint according to the invention, used in conjunction with concrete walls or abutments.

In FIGURE 7 the joint assembly is installed vertically at expansion or construction joints 73 between concrete (or the like) walls or abutments 70 and 71. The neoprene strip 33 is, as illustrated, preferably relaxed or buckled to provide a flexible "fold" of said material in the joint space between 70 and 71, thereby to eliminate strain on the joint 73 and the adjacent mortar and to permit movement. Here again, perforations 62 anchor the metal panels 60 and 61 of the unit in mortar or concrete associated with the walls or abutments 70 and 71.

Figure 7A:
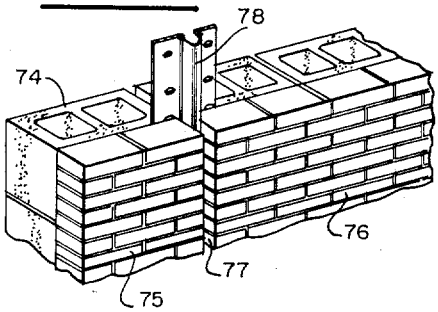
FIGURE 7A is a perspective view of a through wall joint according to the invention, similar to the arrangement of FIGURE 7, but used in conjunction with brick work.

A joint structure similar to that shown in FIGURE 7 may also be employed, as illustrated in FIGURE 7A, in conjunction with brick work. In those arrangements wherein a cinder or concrete block wall 74 is provided, with brick work comprising sections 75 and 76, spaced for purposes of expansion or caulking, by a joint space 77, the structural unit can be installed, as illustrated in FIGURE 7A, to again provide a U-shaped convolution 78 of said neoprene (similar to that of FIGURE 7) extending into the joint space 77. The waterproof joint thus provided affords a convenient backing for exterior caulking.

Figure 8:
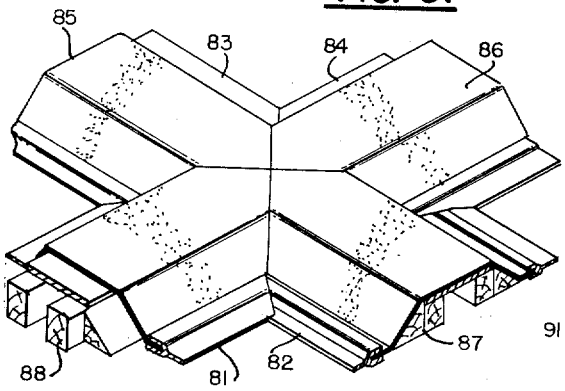
FIGURE 8 is a perspective view of a roof expansion joint according to the invention.

The unit of the present invention can also be employed as a roof expansion joint, as illustrated in FIGURE 8; and this figure shows the metal panels 81, 82, 83 and 84 mechanically fastened to a roof decking under roofing material and brought up over curb 87, 88 to provide continuous weather-tight joints at both 85 and 86, i.e. in transverse directions. Prefabricated corners and cross-overs simplify the construction of irregular joints.

Figure 9:
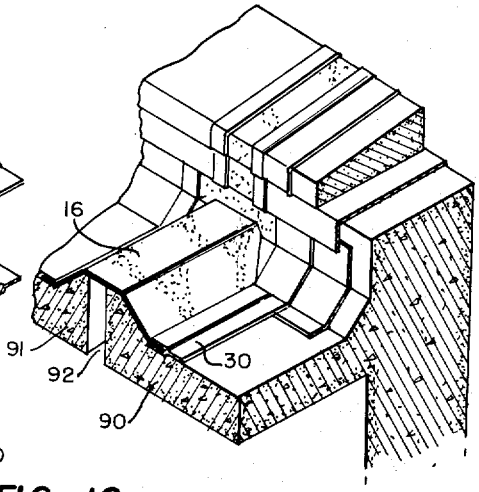
FIGURE 9 is a perspective view of a roof joint at parapet according to the invention.

A roof joint at a parapet is shown at FIGURE 9 to demonstrate the adaptability of the invention as base flashing, through-wall flashing and cap flashing. The metal panels 30 are locked or soldered to standard details. The space 92 between parapet elements 90 and 91 is again sealed by a strip 16, e.g. of neoprene material.

Figure 10:
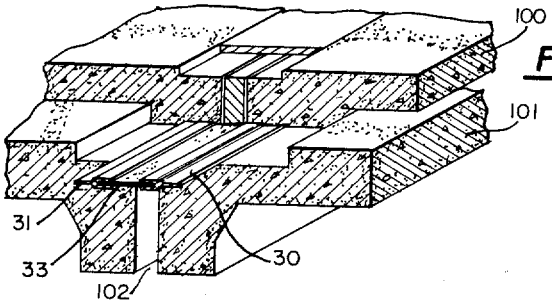
FIGURE 10 is a perspective view of a deck joint according to the invention.

As illustrated in FIGURE 10, the unit of the present invention may also be used in a deck joint; the deck joint of FIGURE 10 being intended to show an installation at an armored expansion joint section of a bridge deck. Panels 30 and 31 may be placed under finger joints 100 to seal space 102 between a pair of supports such as 101. This construction, in addition to permitting desired expansion at the joint, provides a flexible conductor trough for drainage.

Figure 11:
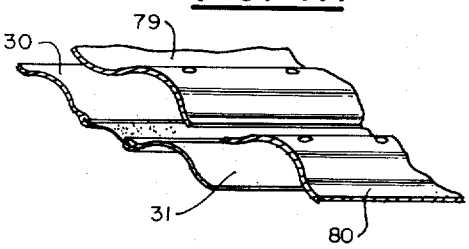
FIGURE 11 is a perspective view of a corrugated roof expansion joint utilizing the structural unit of the present invention.

FIGURE 11 illustrates the adaptability of the structural unit constituting the present invention when used with corrugated roofings and walls, e.g. of the cement-asbestos type. A pair of adjacent sections of such corrugated roofings or walls have been identified by the numerals 79 and 80; and the desired joint therebetween is afforded once more by a structural unit constituting the metal-neoprene stripping of the present invention. As is particularly illustrated in FIGURE 11, the metal portions of the structural joint unit can be themselves bent into a corrugated configuration and held in place adjacent sections 79 and 80 by screw or bolt members. Other shapings of the metal portions 30 and 31 can be readily accomplished, depending only on the particular surface configuration of the adjacent structure with which said metal sections 30 and 31 are intended to cooperate.

All of the foregoing embodiments have been primarily concerned with the use of the metal-neoprene structure in a single roll, it being understood that such a roll may be readily subdivided into appropriate lengths. In many installations, however, the length of material which might be provided in a single roll may not suffice for a given structural arrangement; and it is therefore an important feature of the present invention that the structural materials of the present invention lend themselves readily to splicing, whereby an uninterrupted span of any desired length can be effected merely by joining one or more lengths of the material to one another. When a standard roll is provided with both a plain end and a double tab end, such as has been mentioned previously, splices can be effected by inserting the plain end of one roll into the double tab end of another roll, and thereafter cementing said double tab end to opposing sides of the plain end. This and other splicing procedures will become more readily apparent from FIGURES 12 through 14.

Figure 12:
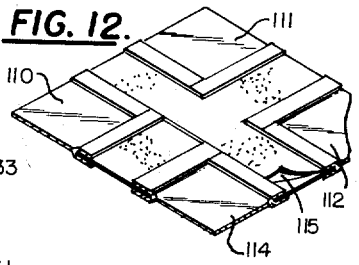
FIGURE 12 is a perspective view of a joint showing splicing.

FIGURE 12 is an illustration of one form of splicing procedure. Each end of a standard roll such as in FIGURE 5, and a corner or cross-over structure as shown in FIGURE 8, is preferably provided with a rubber tab 115. The tab 115 is first carefully cleaned with solvent cleaner, when two such units are to be spliced to one another. Cement is applied to the under side of tab 115 and the upper side of the rubber strip just below it, and allowed to dry for ten minutes. A second coat of cement is thereafter preferably applied, and allowed to dry for another ten minutes. The tab 115 and the strip below, which is another tab 115, are pressed firmly together, and excess cement is bonded over the joint. Panels 110, 114 of one joint are thus joined to panels 111, 112 with their respective tabs 115 overlapping and firmly cemented together in a resilient weather-tight joint by which many lengths or rolls 50 may be fastened together in continuous lengths.

Figure 13:
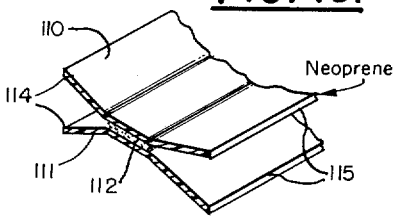
FIGURE 13 is a perspective view of one form of splicing tab which may be employed in accordance with the present invention to join a pair of the structural units, constituting the present invention, to one another.
Figure 13A:
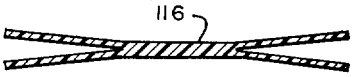
FIGURE 13A illustrates a modified form of splicing tab.

In order to permit any of various configurations to be effected, splicing tabs of the types shown in FIGURES 13 and 13A can be provided. The tab of FIGURE 13 comprises, as illustrated, a pair of elongated neoprene sheets 110 and 111 which are joined at a central portion thereof by an elongated cemented joint 112. The splicing tab of FIGURE 13 is thus provided with a pair of bifurcated edges 114 and 115, each of which bifurcated edges may be cemented to the upper and lower surfaces of adjacent facing ends of a pair of strip lengths such as are shown in FIGURE 5. In addition, as will be appreciated, a splicing tab of the type shown in FIGURE 13 may be applied not only to the ends of a roll of material such as is shown in FIGURE 5, but may indeed be applied along the elongated edges of such material whereby strips of the metal-neoprene structural unit can be spliced to one another laterally as well as longitudinally.

Rather than employing a cemented joint such as 112, the splicing tab can take the form shown in FIGURE 13A. This alternative form of splicing tab is extruded in nature to provide a central joint 116 which is integral with the remainder of the tab.

Figure 14:
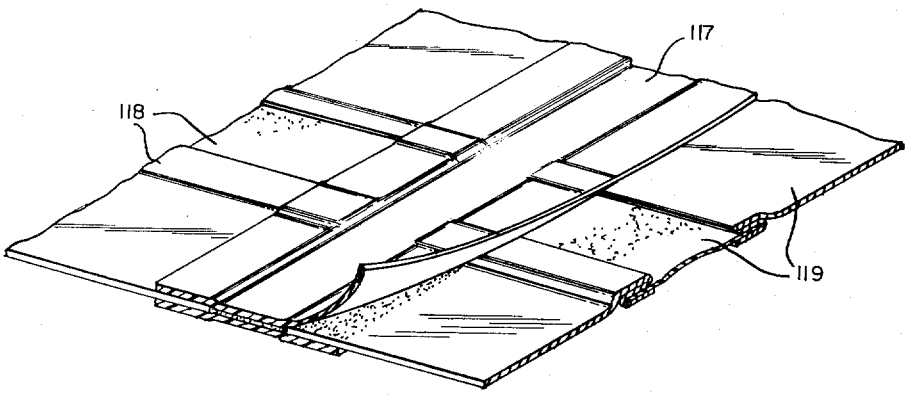
FIGURE 14 illustrates a splicing procedure, and spliced structure, utilizing the splicing tabs of FIGURE 13.

A typical splicing procedure employing a tab of the type shown in FIGURES 13 and 13A has been illustrated in FIGURE 14. In this particular arrangement, the splicing tab, now designated 117, is disposed between one end of a first metal-neoprene structural unit 118 and the adjacent facing end of a similar such metal-neoprene unit 119. In effecting the splice shown in FIGURE 14, the inner surfaces of the bifurcated edge along one side of the tab (e.g. the bifurcated edge 114 of FIGURE 13) should first be separated, carefully cleaned, and allowed to dry, all as described in reference to FIGURE 12. An adhesive is then brushed evenly onto the freshly cleaned inner surfaces of the bifurcated end 114; and these coated surfaces are again permitted to dry. When the adhesive is tacky or dry, one end of a structural metal-neoprene unit, such as 118, is inserted between the two splice portions (e.g. corresponding to 114 in FIGURE 13) comprising one bifurcated edge of the splice; and the flexible bifurcated portions of the splice are then pressed firmly onto the upper and lower surfaces of the structural unit end, with some care being taken to assure that the neoprene material comprising splice 117 fits tightly around the folds of the metal, by forcing it into these folds. As an auxiliary precaution, some further adhesive is then preferably painted thickly along the end of the upper and lower edges of the splice to assure that the joint is sealed tightly on both top and bottom. A similar procedure is, of course, used to join the other edge of the splicing tab (e.g. corresponding to 115 of FIGURE 13) to a second structural unit 119; and by this arrangement, the units 118 and 119 are joined to one another by a firm weatherproof joint, afforded by splicing tab 117.

It should be noted, of course, that the procedure described in reference to FIGURE 14 is preferably employed when two plain ends of the structural unit are to be joined to one another; and in a standard roll of the type shown in FIGURE 5, one end of the roll may alady be provided with a double neoprene tab so that licing can be effected to the plain end of a similar such ll without the necessity of using a splicing tab such that illustrated and described in reference to FIGRES 13 and 14. It should be further noted that, while e spliced arrangement of FIGURE 14 has been emoyed to join two elongated structural units of the prest invention in end-to-end relation, a precisely similar ocedure and splicing tab construction can be employed join such units in side-to-side relation when desired, when structural considerations dictate this latter arngement.

While there have been described above what are prestly believed to be the preferred forms of the invenon, variations thereof will be obvious to those skilled the art and all such changes and variations which fall thin the spirit of the invention are intended to be coved by the generic terms in the appended claims, which e variably worded to that end.

For example, the bifurcations described above may be the synthetic rubber rather than in the panels, as own in FIGS. 13, 13A and 14. That is, these strucres need not be confined to splices, but may comprise e expansible joint itself or other structure discussed ove.

We claim:

1. An expansion joint comprising a length of substanlly parallel relatively inextensible panels, a strip of astomeric material, the inner edges of said elongate nels and the corresponding edges of said strip of elasmeric material being joined together by adhesive bonds, tending along the edges of said strip and along the inner ges of said panels and joining said strip and said panels to an integral structure, said bonds each comprising a furcation along the joined edges of said strip and the id inner edges of said panels such that the lateral marn of at least one of said joined edges in each bond lies tween the forks of said bifurcations in the other edge d adhesive material firmly anchoring said lateral marn within said bifurcations and completing said bond, id strip extending along the length of said panels and ving a tensile strength greater than one thousand unds per square inch and an elongation of at least one ndred percent, said bond having a peel-pull strength lue at least equal to thirty-five pounds per inch per inute.

2. The combination set forth in claim 1, said panels ing composed of metal and having mortar engaging eans and each said bifurcation comprising an open U ving single thickness walls of less than half the width said metal panels and integral therewith.

3. The combination set forth in claim 2, said mortar gaging means comprising perforations spaced along e length of said metal panels said elastomeric strip mprising synthetic rubber in the form of neoprene.

4. The combination set forth in claim 2, said mortar gaging means comprising offset portions of said metal nels.

5. The combination set forth in claim 1, said bifurcaons being substantially completely filled and acting to event movement of the said marginal edge anchored erein relative thereto whereby extension of the expanon joint is confined substantially to extension of said rip of elastomeric material between its bonded edges.

6. The combination set forth in claim 5, said strip of astomeric material comprising synthetic rubber, said furcations extending along said inner edges of said pans and being integral therewith, said lateral margin withsaid bifurcations being the respective lateral marginal lges of said strip of synthetic rubber which substantially mpletely fills said bifurcation and is adhered thereto by id bond and substantially immobilized by the material said bifurcation so as to be relatively inextensible hereby step-by-step incremental breaking of said bond reduced.

7. The combination set forth in claim 1, said strip of elastomeric material comprising synthetic rubber, said bifurcation being in the lateral edges of and integral with said strip of synthetic rubber, and having said inner edges of said panels within said bifurcations and adhesively bonded thereto by said bond whereby said bonded bifurcations are rendered relatively inextensible and incremental breaking of said bond is minimized.

8. An expansion joint comprising a length of a pair of parallel sheet metal panels of substantial width, each having a relatively narrow bifurcation along its inner edge with the open elongate edges of said bifurcations facing each other, a strip of synthetic rubber of substantial width to provide lateral stretch and having one lateral margin within one bifurcation and the other lateral margin within the other bifurcation, adhesive material comprising a primer and a vulcanizing cement firmly anchoring said strip within said bifurcations forming a mechanical-adhesive bond therebetween, said strip of synthetic rubber having a tensile strength greater than one thousand pounds per square inch and a transverse elongation between the elongate edges of said bifurcations of at least one hundred percent, forming a joint capable of wide dimensional variation in three dimensions and of assuring a wide variety of shapes and surface configurations as may be required to form a water-tight expansion joint for building applications, free from soldered and caulked joints and from metal fatigue, said sheet metal panels comprising at least one metal from the class containing copper, aluminum, leaded copper, stainless steel and galvanized iron.

9. The combination set forth in claim 8, said strip of synthetic rubber comprising neoprene said bifurcations being integral with the respective sheet metal panel and having single thickness walls and mortar engaging means carried by said metal panels.

*10. An expansion joint comprising a length of substantially parallel relatively inextensible panels, a strip of elastomeric material, the inner edges of said elongate panels and the corresponding edges of said strip of elastomeric material being joined together by adhesive bonds, extending along the edges of said strip and along the inner edges of said panels and joining said strip and said panels into an integral structure, said bonds each comprising a bifurcation along the joined edges of said strip and the said inner edges of said panels such that the lateral margin of at least one of said joined edges in each bond lies between the forks of said bifurcations in the other edge and adhesive material firmly anchoring said lateral margin within said bifurcations and completing said bond, said strip extending along the length of said panels and having a tensile strength greater than one thousand pounds per square inch and an elongation of at least one hundred percent, said bond having a substantial peel-pull strength value.*

*11. An expansion joint comprising a length of a pair of parallel sheet metal panels of substantial width, each having a relatively narrow bifurcation along its inner edge with the open elongate edges of said bifurcations facing each other, a strip of synthetic rubber of substantial width to provide lateral stretch and having one lateral margin within one bifurcation and the other lateral margin within the other bifurcation, adhesive material firmly anchoring said strip within said bifurcations forming a mechanical-adhesive bond therebetween, said strip of synthetic rubber having a tensile strength greater than one thousand pounds per square inch and a transverse elongation between the elongate edges of said bifurcations of at least one hundred percent, forming a joint capable of wide dimensional variation in three dimensions and of assuring a wide variety of shapes and surface configurations as may be required to form a water-tight expansion joint for building applications, free from soldered and caulked joints and from metal fatigue,*

*said sheet metal panels comprising weather-resistant material.*

References Cited by the Examiner

The following references, cited by the Examiner, are of record in the patented file of this patent or the original patent.

UNITED STATES PATENTS

| | | | |
|---|---|---|---|
| 166,919 | 8/75 | Douglass | 20—69 |
| 387,078 | 7/88 | Johnston | 20—69 |

| | | | |
|---|---|---|---|
| 1,960,137 | 5/34 | Brown | 161—160 |
| 2,226,886 | 12/40 | Willis | 50—47 |
| 2,228,052 | 1/41 | Gardner | 50—346 |
| 2,379,179 | 6/45 | Petersen | 20—92 |
| 2,545,705 | 3/51 | Riesner | 50—47 |
| 2,599,994 | 6/52 | Hirsch | 20—15 |
| 2,641,203 | 6/53 | Coleman | 50—45 |
| 2,751,109 | 6/56 | Moore | 220—80 |

RICHARD W. COOKE, JR., *Primary Examiner.*